United States Patent
Jia et al.

(10) Patent No.: US 10,545,934 B2
(45) Date of Patent: Jan. 28, 2020

(54) REDUCING DATA STORAGE REQUIREMENTS

(71) Applicant: Facebook, Inc., Menlo Park, CA (US)

(72) Inventors: Hongzhong Jia, Cupertino, CA (US); Rajiv Krishnamurthy, Sunnyvale, CA (US); Lin Qiao, San Jose, CA (US); Joshua David Metzler, Redwood Shores, CA (US)

(73) Assignee: Facebook, Inc., Menlo Park, CA (US)

( * ) Notice: Subject to any disclaimer, the term of this patent is extended or adjusted under 35 U.S.C. 154(b) by 260 days.

(21) Appl. No.: 15/638,588

(22) Filed: Jun. 30, 2017

(65) Prior Publication Data
US 2019/0005075 A1    Jan. 3, 2019

(51) Int. Cl.
| | |
|---|---|
| G06F 16/21 | (2019.01) |
| G06F 9/30 | (2018.01) |
| G06F 17/15 | (2006.01) |
| G06F 16/23 | (2019.01) |

(52) U.S. Cl.
CPC ......... *G06F 16/217* (2019.01); *G06F 9/3004* (2013.01); *G06F 16/2365* (2019.01); *G06F 17/15* (2013.01)

(58) Field of Classification Search
None
See application file for complete search history.

(56) References Cited

U.S. PATENT DOCUMENTS

| | | | | |
|---|---|---|---|---|
| 8,326,760 B2* | 12/2012 | Ma | ............ | G06Q 20/40 705/35 |
| 2006/0047704 A1* | 3/2006 | Gopalakrishnan | ...... | G06F 16/51 |
| 2015/0168538 A1* | 6/2015 | Bradley | ............ | G01S 5/18 367/127 |
| 2016/0042366 A1* | 2/2016 | Lux | ............ | G06F 16/2228 705/7.29 |
| 2016/0071162 A1* | 3/2016 | Ogawa | ............ | G06Q 30/0269 705/14.66 |
| 2016/0300252 A1* | 10/2016 | Frank | ............ | G06Q 30/0203 |
| 2016/0373891 A1* | 12/2016 | Ramer | ............ | H04W 4/02 |
| 2017/0140141 A1* | 5/2017 | Yan | ............ | G06F 21/32 |
| 2017/0180567 A1* | 6/2017 | Sharma | ............ | H04M 15/00 |
| 2017/0236063 A1* | 8/2017 | Dorris | ............ | G06F 19/30 706/11 |

* cited by examiner

*Primary Examiner* — Wilson Lee
(74) *Attorney, Agent, or Firm* — FisherBroyles, LLP

(57) ABSTRACT

A dataset management system ("system") reduces the amount of data to be stored for future analyses. The system determines a sampling rate of the data based on a required level of accuracy, and samples the data at the determined sampling rate. Initially, all data transactions ("full dataset") and the sampled data ("sampled dataset") are logged and stored. Based upon a trigger condition, e.g., after a specified period, the full dataset and the sampled dataset are analyzed separately and the analysis results are compared. If the comparison is sufficiently similar (i.e., the sampling produces a sufficiently accurate set of data or a variance between the analysis results of the datasets is within a specified threshold), the system discontinues full data logging and stores only the sampled dataset. Further, the full dataset is deleted. The sampling thus reduces the required data volume significantly, thereby minimizing consumption of the storage space.

20 Claims, 6 Drawing Sheets

REDUCING DATA STORAGE REQUIREMENTS

BACKGROUND

Data warehouses store data transactions that can be used for various analyses. The data transactions can be associated with a variety of applications, e.g., online shopping applications, and social networking applications. Applications may have to perform various types of analyses for various purposes. For example, some applications may have to analyze the data transactions stored in the data warehouses to determine their most popular selling product for a particular season so that they can stock the product accordingly. In another example, the applications may want to identify the demographic characteristics of the users who buy a specified set of products so that they can recommend related products to those users. Some analyses may require large volumes of granular data transaction and some may not. Since the data that may be needed for future analyses is not predictable, the applications end up storing a large volume of granular data transactions. Some social networking platforms have many millions of users and therefore can generate significant amount of data associated with transactions performed by the users. Storing such data can consume significant data storage resources and can result in increased data storage costs. Further, analyzing large volumes of data, especially in cases when such large volumes of data are not necessary for a set of analyses, can also result in increased consumption of computing resources and/or network resources.

DETAILED DESCRIPTION

Figure 1A:
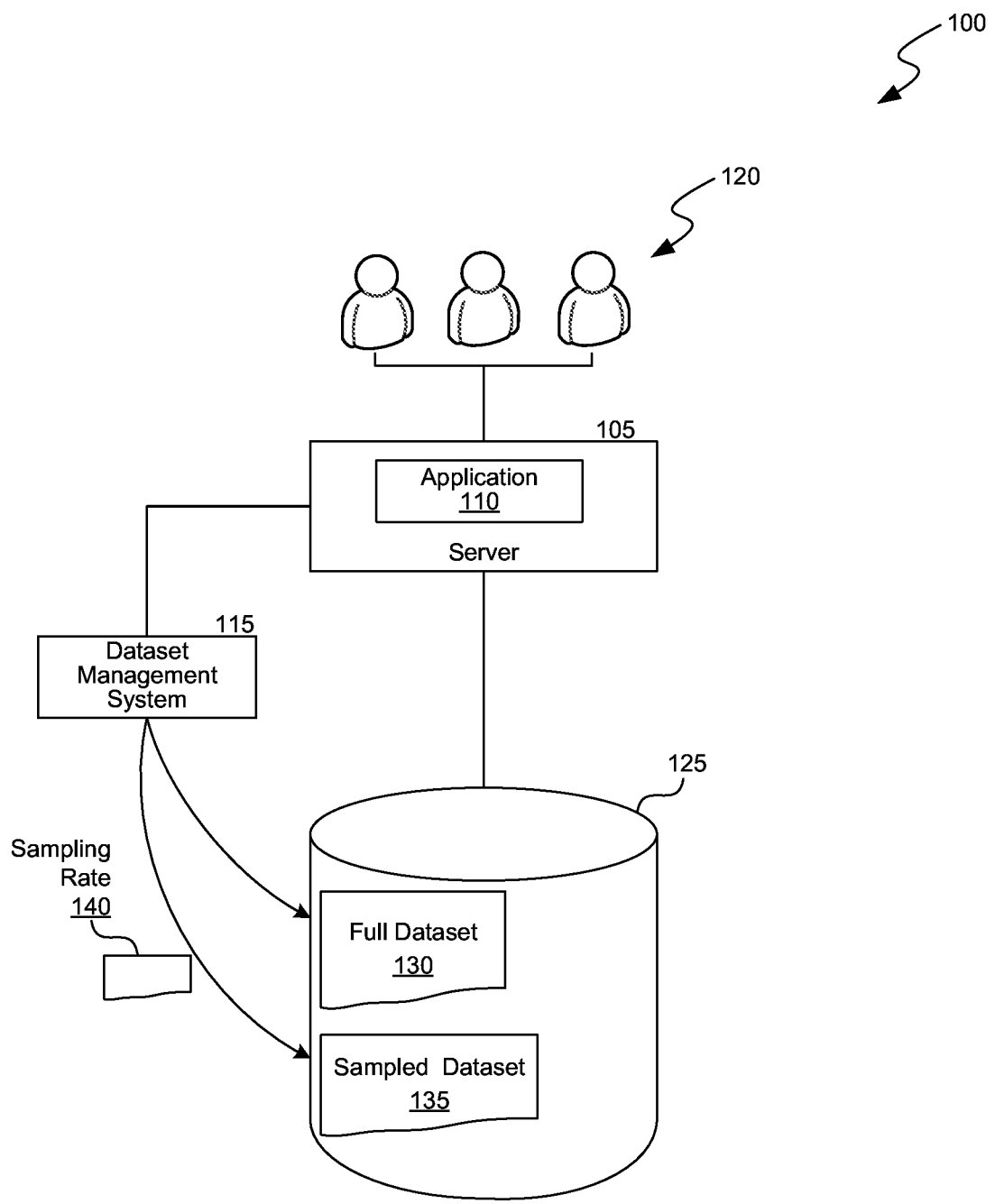
FIG. 1A is a block diagram illustrating an environment in which the disclosed embodiments can be implemented.

Embodiments are directed to a dataset management system that reduces the amount of data to be stored for future analyses. The dataset management system determines a sampling rate of the data based on a required level of accuracy, and samples the data at the determined sampling rate. The data can be transaction data associated with multiple transactions performed in an application, e.g., a social networking application, by multiple users of the application. For an initial period of N days, all the previously logged data ("full dataset") and the sampled data ("sampled dataset") are logged and stored. After a specified period, e.g., N days, the full dataset and the sampled dataset are analyzed separately and the analysis results are compared. If the comparison is sufficiently similar (i.e., the sampling produces a sufficiently accurate set of data or a variance between the analysis results of the datasets is within a specified threshold), the dataset management system discontinues full data logging and stores only the sampled dataset. Further, the full dataset is deleted from the data storage system. The sampling thus reduces the required data volume significantly, thereby minimizing consumption of the data storage space.

In some embodiments, the sampling rate of the data is determined based on the required level of accuracy using statistical methods. The level of accuracy can be indicated using various indicators, e.g., as a percentage such as "90%" "99%," as enumerated values such as "Low," "Medium" or "High," as a range such as "0" to "5," with "5" being highest level of accuracy. The sampling rate is such that a dataset generated using the sampling rate is a portion of the full dataset, e.g., a subset of the entire transactions are logged, and consumes significantly lesser storage space than the full dataset. The sampling rate can be tuned in various ways. For example, the sampling rate can be tuned to sample transaction data associated with a subset of the transactions performed in the application. In another example, the sampling rate can be tuned to sample transaction data associated with transactions performed by a subset of the users of the application. In still another example, the sampling rate can be tuned to sample transaction data associated with transactions performed in a specified period, e.g., specified time of a day, specified days of a week, specified days of a month, and specified months of a year.

The comparison between the two datasets provides an indication of the accuracy of the sampled dataset. The comparison can be performed using various methods. For example, a query that is used for performing a specified analysis can be executed on the full dataset, which represents data logged for all transactions performed in the application, to generate a first result and on the sampled dataset to generate a second result, and the two results can be compared to determine if they are sufficiently similar, e.g., a variance between the two results is within a specified threshold. In another example, the two datasets are compared using statistical analysis methods, e.g., standard deviation, percentile, mean average. In yet another example, the datasets can be compared using forecasting methods, e.g., determining a first projection based on the full dataset and a second projection based on the sampled dataset, and determining whether the projections are sufficiently similar, e.g., a variance between the two results is within a specified threshold.

Turning now to Figures, FIG. 1A is a block diagram illustrating an environment 100 in which the dataset management system can be implemented. The environment 100 includes a server computing device ("server") 105 that hosts an application 110. The application 110 provides one or more services to users 120. The users 120 can access the application 110 on the server 105 using a client computing device ("client device"), e.g., a desktop, a laptop, a smartphone, a tablet PC, a wearable device. In some embodiments, the application 110 is a social networking application providing social networking services to the users 120. In some embodiments, the application 110 is a shopping application providing online shopping services to the users 120. One or more of the users 120 can perform transactions in the application 110, e.g., shopping transactions and social networking transactions. The application 110 can store transaction data, e.g., data associated with the transactions, in a data storage system 125. The transaction data can be used for various purposes, e.g., for performing various analyses. For example, the transaction data can be analyzed to determine an average age of the users who buy a specified product or perform a specified transaction.

The environment 100 includes a dataset management system 115 that logs the transaction data in the data storage system 125. The dataset management system 115 can log the full dataset 130, e.g., data associated with all transactions performed in the application 110, or a portion of the full dataset 130, e.g., sampled dataset 135, or both. The sampled dataset 135 can represent transaction data of a subset of the transactions performed in the application 110. Typically, the sampled dataset 135 is smaller in size and consumes lesser data storage space than the full dataset 130. In some embodiments, the dataset management system 115 deletes the full dataset 130 if the generated sampled dataset 135 meets the required level of accuracy details of which are described below.

In some embodiments, the dataset management system 115 generates the sampled dataset 135 based on a sampling rate 140. The sampling rate 140 can be determined based on a required level of accuracy from the sampled dataset 135. The level of accuracy can be indicated using various indicators, e.g., as a percentage such as "90%" "99%," as enumerated values such as "Low," "Medium" or "High," as a range such as "0" to "5," with "5" being highest level of accuracy. The required level of accuracy can indicate how accurate the sampled dataset 135 is expected to be when compared to the full dataset 130. That is, if the two analysis results generated using the full dataset 130 and the sampled dataset 135 are sufficiently similar, e.g., a variance or difference between the two results is within a specified threshold, then the sampled dataset 135 is considered to be accurate. The dataset management system 115 can recommend or determine the sampling rate 140 based on the required level of accuracy, e.g., using statistical methods. For example, if the required level of accuracy is "99%," the dataset management system 115 can recommend a sampling rate of "1%," which can mean that the dataset management system 115 generates the sampled dataset 135 by sampling "1%" of the transactions performed in the application 110. In another example, if the required level of accuracy is "99.5%," the dataset management system 115 can recommend a sampling rate of "2%," which can mean that the dataset management system 115 generates the sampled dataset 135 by sampling "2%" of the transactions performed in the application 110. A user, e.g., a consumer of the analysis results of the transaction data, can input the required level of accuracy as an accuracy parameter. Note that the above values are for illustration only and are not representative of the actual values.

In some embodiments, the consumer may specify the sampling rate 140 and the dataset management system 115 can in turn determine the expected accuracy of the sampled dataset 135 generated using the specified sampling rate 140. The sampling rate 140 can be tuned in various ways. For example, the sampling rate 140 can be tuned to sample transaction data associated with a subset of the transactions performed in the application. In another example, the sampling rate 140 can be tuned to sample transaction data associated with transactions performed by a subset of the users 120. In still another example, the sampling rate 140 can be tuned to sample transaction data associated with transactions performed in a specified period, e.g., specified time of a day, specified days of a week, specified days of a month, and specified months of a year.

Figure 1B:
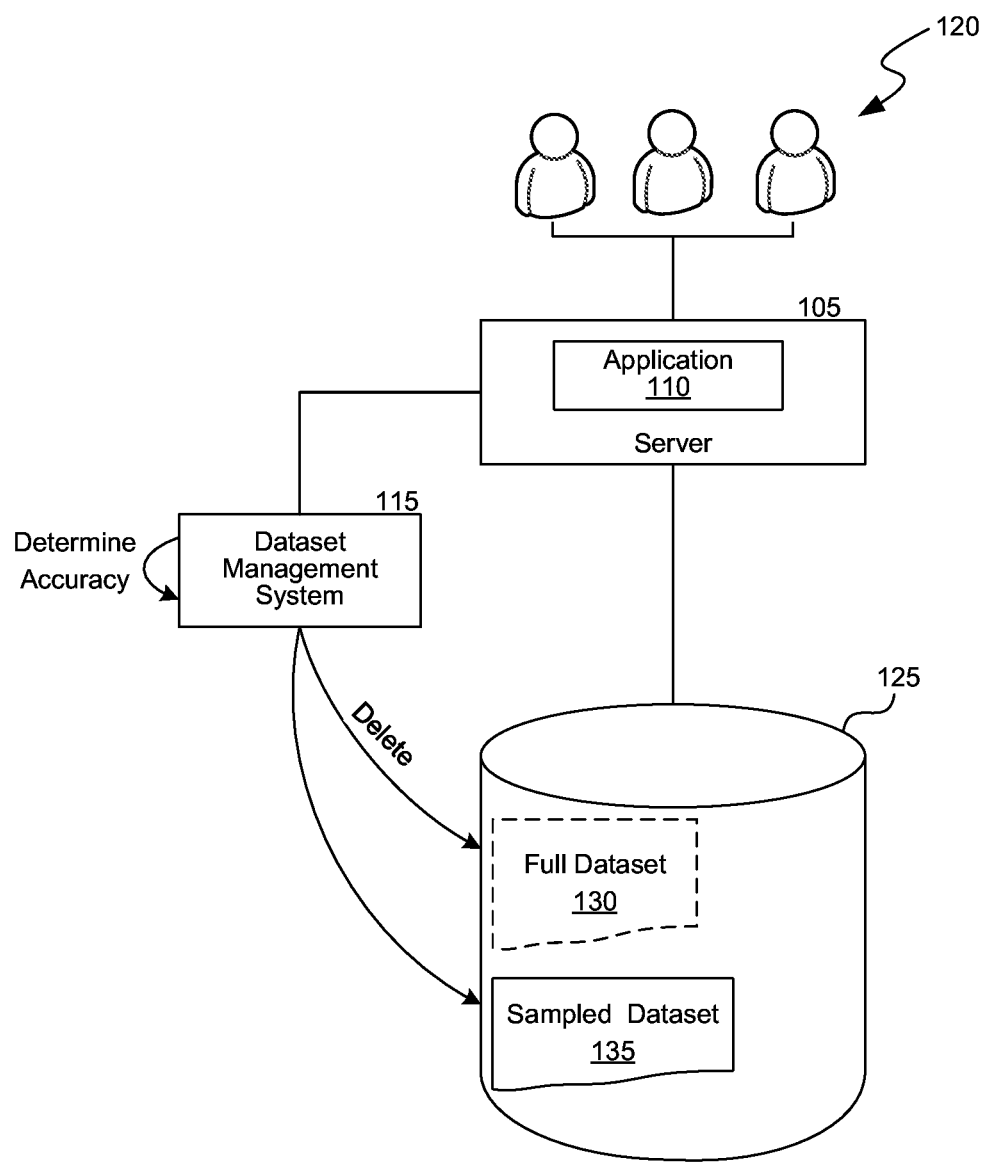
FIG. 1B is a block diagram of an example for managing a full dataset and a sampled dataset logged for transactions performed in the application of FIG. 1A, consistent with various embodiments.

FIG. 1B is a block diagram of an example for managing the full dataset and the sampled dataset logged for the transactions performed in the application of FIG. 1A, consistent with various embodiments. The dataset management system 115 determines the accuracy of the sampled dataset 135. In some embodiments, the accuracy is determined upon a trigger condition. For example, the accuracy can be determined at regular time intervals, e.g., after N number of days, after a specified number of transactions, when the full dataset 130 reaches a specified file size, or when the available storage space in the data storage system 125 is below a specified threshold, etc.

To determine the accuracy of the sampled dataset 135, the dataset management system 115 can compare the sampled dataset 135 with the full dataset 130. If the comparison is sufficiently similar, e.g., a variance or difference between an analysis result of the full dataset 130 and the sampled dataset 135 is within a specified threshold, the dataset management system 115 considers the sampled dataset 135 to be accurate. For example, consider that the application 110 is a shopping service and the transaction data includes data associated with shopping transactions performed by the users 120. Also, consider that the transaction data is to be analyzed to determine an average age of the users who ordered flowers over the last one month. The dataset management system 115 analyzes the full dataset 130, e.g., transaction data associated with all transactions of the application over the last one month, and determines that the average age of the users who ordered flowers over the last one month to be "25 years." Similarly, the dataset management system 115 analyzes the sampled dataset 135, e.g., transaction data associated with a subset of the transactions of the application which are sampled based on a specified sampling rate, and determines that the average age of the users who ordered flowers over the last one month to be "25.25 years." The dataset management system 115 compares the first result of "25 years" with the second result of "25.25 years." The second result, which is based on the analysis of the sampled dataset 135 is "1%" off of the first result, that is, the second result is "99%" accurate. If the sampled dataset 135 satisfies the accuracy requirement, e.g., the accuracy is of a specified percent, or a variance between the first result and the second result is within a specified threshold, the dataset management system 115 considers the sampled dataset 135 to be accurate. If the sampled dataset 135 is not found to be accurate, the dataset management system 115 can re-compute or adjust the sampling rate 140 to generate an adjusted sampling rate. For example, the sampling rate 140 can be increased to a higher sampling rate or tuned to sample the data differently, e.g., sample all transactions of a specified subset of the users 120 instead of randomly sampling a specified percentage of all transactions.

If the sampled dataset 135 is found to be accurate, the dataset management system 115 can delete the full dataset 130 and free up the storage space consumed by the full dataset 130 in the data storage system 125. By storing only a portion of the full dataset, not only the dataset management system 115 save the data storage space consumed, it also minimizes the computing resources involved in analyzing the transaction data as the server 105 has to analyze only a subset of the entire transaction data. Thus, by minimizing the amount of data to be stored, the dataset management system 115 improves a functioning of the computer.

Note that the above analysis and comparison can be performed using various methods. In some embodiments, the analysis of the transaction data is performed using a query. For example, a query can be generated to determine the average age of the users who ordered flowers over the last one month, and the query can be executed on the full dataset 130 to generate the first result and on the sampled dataset to generate the second result. In another example, the two datasets are compared using statistical analysis methods, e.g., standard deviation, percentile, mean average. In yet another example, the datasets can be compared using forecasting methods, e.g., determining a first projection based on the full dataset 130 and a second projection based on the sampled dataset 135, and determining whether the projections are sufficiently similar, e.g., a variance between the two projections is within a specified threshold.

Figure 2:
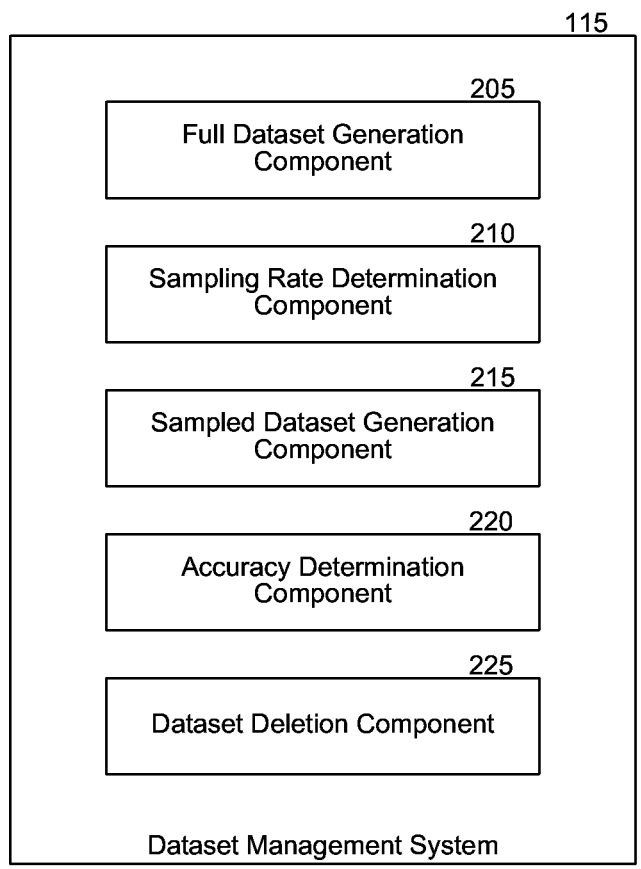
FIG. 2 is a block diagram of a data management system, consistent with various embodiments.

FIG. 2 is a block diagram of the data management system of FIG. 1, consistent with various embodiments. The dataset management system 115 includes a full dataset generation component 205 that generates a full dataset, e.g., the full dataset 130. The full dataset generation component 205 monitors the application 110 for any transactions performed by the users 120 and logs data associated with those transactions in the full dataset 130. In some embodiments, an administrator user or a consumer of analysis results can specify what specific data associated with a transaction is to be logged.

The dataset management system 115 includes a sampling rate determination component 210 that determines a sampling rate based on an accuracy parameter. The accuracy parameter indicates the required level of accuracy from the sampled dataset 135. The sampling rate determination component 210 can receive the accuracy parameter as an input from a user, e.g., a consumer of the transaction data analysis results. In some embodiments, the sampling rate determination component 210 can receive the sampling rate as an input instead of the accuracy parameter in which case the sampling rate determination component 210 presents or generates the expected accuracy of the sampled dataset generated based on the received sampling rate.

The dataset management system 115 includes a sampled dataset generation component 215 that generates a sampled dataset, e.g., the sampled dataset 135, based on the sampling rate determined or received by the sampling rate determination component 210. The sampled dataset 135 typically has transaction data of smaller number of transactions than that of the full dataset 130, and also consumes lesser data storage space than the full dataset 130.

The dataset management system 115 includes an accuracy determination component 220 that determines an accuracy of the sampled dataset, e.g., the sampled dataset 135 generated by the sampled dataset generation component 215. The accuracy determination component 220 can determine the accuracy of the sampled dataset 135 by comparing the sampled dataset 135 with the full dataset 130, e.g., as described above at least with reference to FIG. 1B. The accuracy determination component 220 then determines whether the accuracy of the sampled dataset 135 matches the required level of accuracy.

The dataset management system 115 includes a dataset deletion component 225 that deletes the full dataset 130 upon a determination that the accuracy of the sampled dataset 135 matches the required level of accuracy. Thus, by maintaining the sampled dataset 135 in place of the full dataset 130, the data storage space required for storing the transaction data necessary for performing the future analyses is minimized compared to the data storage space that would have been consumed by the full dataset 130.

The dataset management system 115 can be implemented on a separate server or in the server 105 in which the application 110 is hosted. In some embodiments, the dataset management system 115 can be implemented in a distributed architecture in which different components of the dataset management system 115 are implemented on different machines or computers. Further, the components in the dataset management system 115 can be combined to a fewer components such that functionalities of two different components are performed by a single component. A specified component of the dataset management system 115 can also be split into two or more components such that different functionalities of the specified component are performed by different components or a specified functionality is performed by multiple components.

Figure 3:
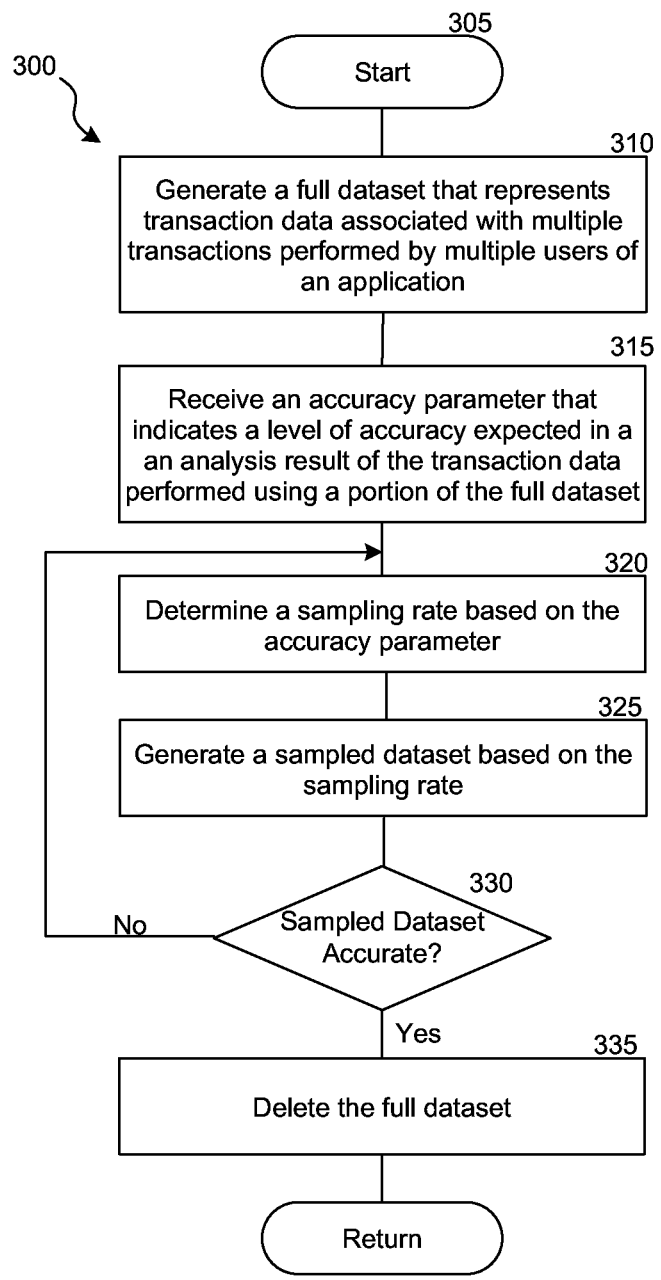
FIG. 3 is a flow diagram of a process of reducing a volume of data to be stored for performing analyses, consistent with various embodiments.

FIG. 3 is a flow diagram of a process 300 of reducing a volume of data to be stored for performing analyses, consistent with various embodiments. The process 300 may be executed in an environment 100 of FIGS. 1A and 1B. The process 300 generates a compact version of the full dataset, e.g., the sampled dataset 135, that can be used instead of the full dataset for performing various analyses. The process 300 begins at block 305, and at block 310, the full dataset generation component 205 generates a full dataset, e.g., the full dataset 130, that stores transaction data associated with all transactions performed by the users 120 of the application 110.

At block 315, the sampling rate determination component 210 receives an accuracy parameter that indicates a level of accuracy expected from a sampled dataset that is to be generated. In some embodiments, the accuracy of the sampled dataset is determined based at least in part on a result of the analysis of the transaction data performed using the sampled dataset. As described above, the level of accuracy can be indicated using various indicators, e.g., as a percentage such as "90%," "99%," as enumerated values such as "Low," "Medium" or "High," and as a range such as "0" to "5," with "5" being highest level of accuracy.

At block 320, the sampling rate determination component 210 determines a sampling rate, e.g., the sampling rate 140, based on the accuracy parameter. In some embodiments, the sampling rate determination component 210 uses statistical methods to determine the sampling rate. As described above, the sampling rate 140 can be tuned in various ways. For example, the sampling rate 140 can be tuned to sample transaction data associated with a subset of the transactions performed in the application. The subset of the transactions to be sampled can be chosen randomly or based on any other criterion, e.g., user-specified criterion. In another example, the sampling rate 140 can be tuned to sample transaction data associated with transactions performed by a subset of the users 120. The subset of the users whose transactions are to be sampled can be chosen randomly or based on any other criterion, e.g., users from a specified geographical location, users in a specified age range, users of a specified gender, ethnicity, or any user-specified criterion. In still another example, the sampling rate 140 can be tuned to sample transaction data associated with a specified percentage of transactions performed by each of the users 120. In yet another example, the sampling rate 140 can be tuned to sample transaction data associated with transactions performed in a specified period, e.g., specified time of a day, specified days of a week, specified days of a month, and specified months of a year.

At block 325, the sampled dataset generation component 215 generates a sampled dataset based on the sampling rate, e.g., determined in block 315. For example, the sampled dataset generation component 215 generates the sampled dataset 135 based on the sampling rate 140. The sampled dataset 135 typically has transaction data of a smaller number of transactions than the full dataset 130 stores. That is, the sampled dataset 135 stores transaction data of a subset of the transactions for which the transaction data is stored in the full dataset 130. The sampled dataset also consumes significantly lesser data storage space than the full dataset 130.

Note that the logging or generation of the full dataset 130 and the sampled dataset 135 can be performed simultaneously or in parallel.

At determination block 330, the accuracy determination component 220 determines whether the sampled dataset, e.g., sampled dataset generated in block 325, is accurate. For example, the accuracy determination component 220 determines the accuracy of the sampled dataset 135 by comparing the sampled dataset 135 with the full dataset 130, e.g., as described above at least with reference to FIG. 1B and also with reference to FIG. 4 below. The accuracy determination component 220 determines whether the accuracy of the sampled dataset 135 matches the required level of accuracy. If the sampled dataset 135 matches the required level of accuracy, the accuracy determination component 220 determines the sampled dataset to be accurate, and at block 335, the dataset deletion component 225 deletes the full dataset 130 and, in some embodiments, discontinues generating the full dataset any further, thereby minimizing the data storage space required for storing the transaction data necessary for performing the future analyses.

If the sampled dataset 135 does not match the required level of accuracy, the control is transferred to block 320 to re-compute or adjust the sampling rate. Adjusting the sampling rate can include (a) increasing the sampling rate to sample more transactions than before or (b) tuning the sampling rate to sample the transactions differently, e.g., sample all transactions of a specified subset of the users 120 instead of randomly sampling a specified percentage of all transactions.

In some embodiments, the determination of whether the sampled dataset 135 is accurate is performed in response to a trigger. For example, the accuracy can be determined at regular time intervals, e.g., after N number of days, after a specified number of transactions, when the full dataset 130 reaches a specified file size, or when the available storage space in the data storage system 125 is below a specified threshold, etc. Until the accuracy is determined, the dataset management system 115 may continue to log both the full dataset 130 and the sampled dataset 135.

Figure 4:
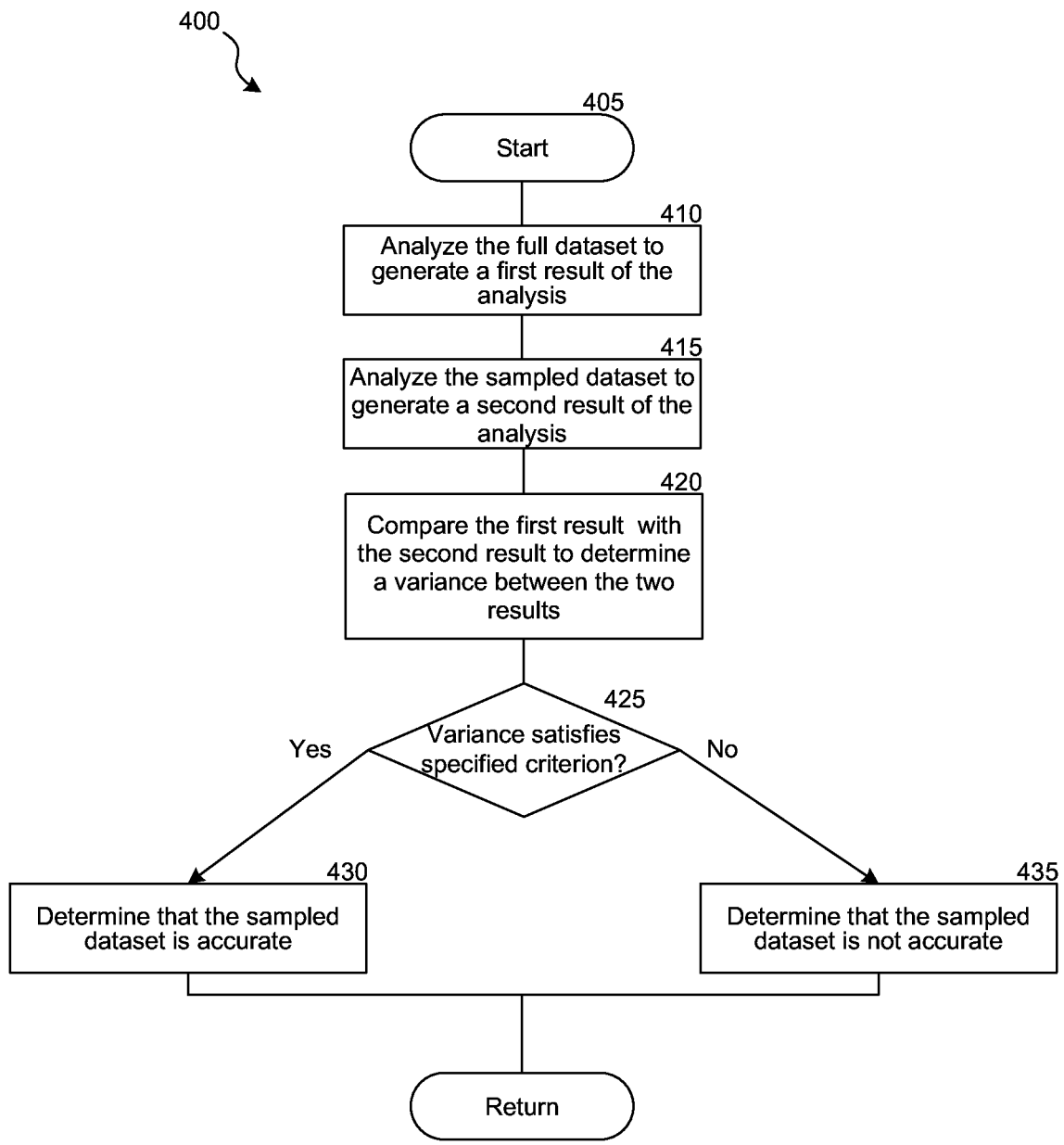
FIG. 4 is a flow diagram of a process for determining the accuracy of the sampled dataset, consistent with various embodiments.

FIG. 4 is a flow diagram of a process 400 for determining the accuracy of the sampled dataset, consistent with various embodiments. The process 400 may be executed in the environment 100 of FIG. 1, and as part of determination block 330 of FIG. 3. To determine the accuracy of the sampled dataset 135, the accuracy determination component 220 can compare the sampled dataset 135 with the full dataset 130. The comparison can be performed using various methods, e.g., queries, statistical methods, forecasting. The process 400 begins at block 405, and at block 410, the accuracy determination component 220 analyses the full dataset to generate a first result of the analysis. In some embodiments, the analysis of the transaction data is performed using a query. For example, a query can be generated to determine the average age of the users who ordered flowers over the last one month. The accuracy determination component 220 can execute the query on the full dataset 130 to generate the first result, e.g., average age of the users who ordered flowers over the last one month.

At block 415, the accuracy determination component 220 analyzes the sampled dataset to generate a second result of the analysis. For example, the query executed on the full dataset 130 to generate the first result can be executed on the sampled dataset 135 to generate the second result, e.g., average age of the users who ordered flowers over the last one month.

At block 420, the accuracy determination component 220 compares the first result with the second result. For example, consider that a query to determine the average age of the users who ordered flowers over the last one month generated a first result with the average age as "25 years" when executed on the full dataset 130 and the second result as "25.25 years" when executed on the sampled dataset. The accuracy determination component 220 compares the first result of "25 years" with the second result of "25.25 years." The second result, which is based on the analysis of the sampled dataset 135 varies from the first result by "1%", that is, the second result is "99%" accurate.

At determination block 425, the accuracy determination component 220 determines whether the sampled dataset 135 is accurate or satisfies the accuracy requirement, e.g., the variance between the first result and the second result is within a specified threshold. If the sampled dataset 135 satisfies the accuracy requirement, at block 430, the accuracy determination component 220 determines the sampled dataset 135 to be accurate. On the other hand, if the sampled dataset 135 does not satisfy the accuracy requirement, at block 435, the accuracy determination component 220 determines the sampled dataset 135 to be inaccurate.

Note that the above analysis and comparison can be performed using various methods. While the above process describes the analysis and comparison using a query, they are not restricted to query. Other methods, including statistical analysis methods, such as standard deviation, percentile, mean average, forecasting methods, etc. can be used to perform the analysis and comparison.

Figure 5:
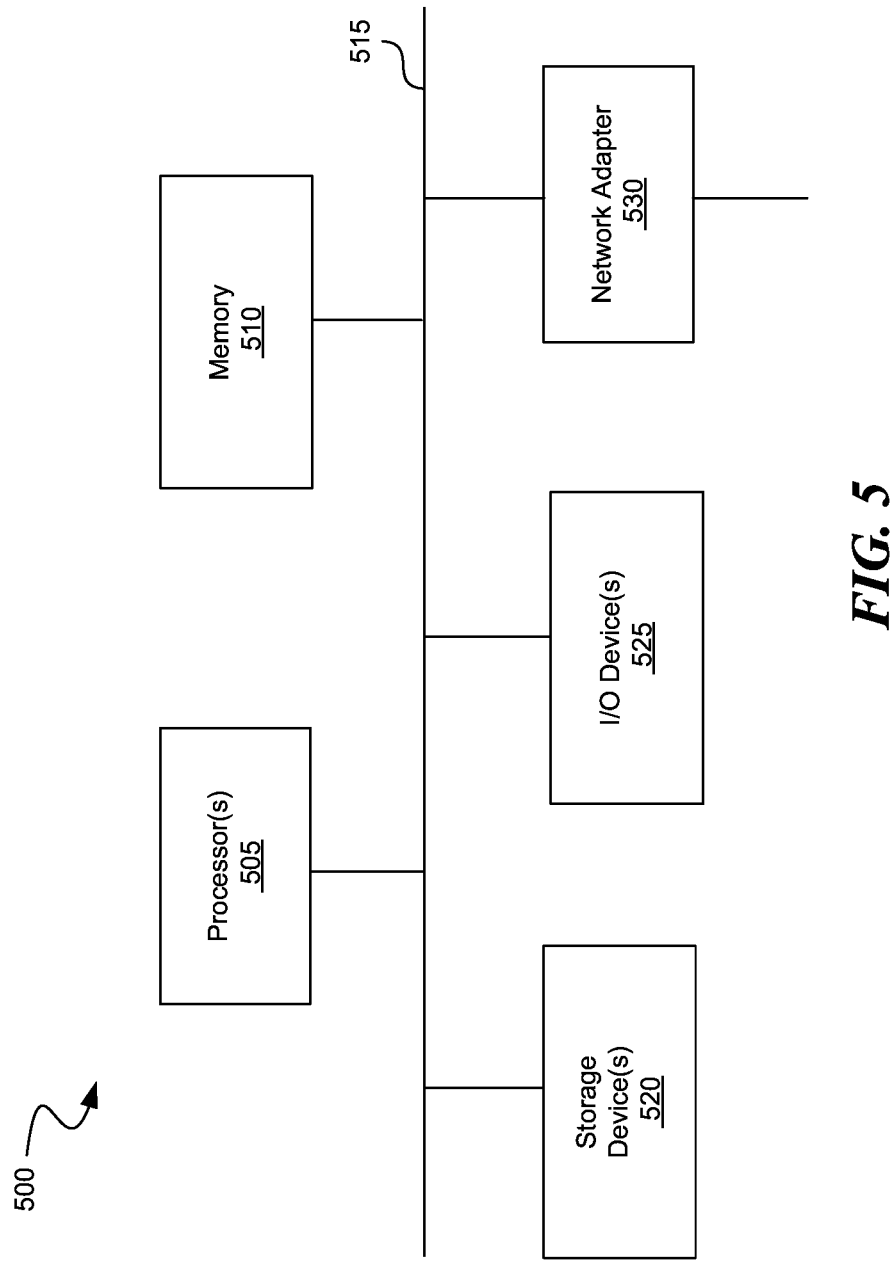
FIG. 5 is a block diagram of a computer system as may be used to implement features of the disclosed embodiments.

FIG. 5 is a block diagram of a computer system as may be used to implement features of the disclosed embodiments. The computing system 500 may be used to implement any of the entities, components, modules, systems, or services depicted in the examples of the foregoing figures (and any other entities described in this specification). The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media).

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a specified feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
    storing, by a server device, a full dataset in a data storage system, the full dataset representing transaction data associated with multiple transactions performed by multiple users of an application;
    receiving, at the server device, an accuracy parameter that indicates a level of accuracy expected in a result of analysis of the transaction data;
    determining, by the server device, a sampling rate of the multiple transactions based on the accuracy parameter, the sampling rate causing the server device to store the transaction data of a subset of the multiple transactions;
    generating, by the server device, a sampled dataset based on the sampling rate, the sampled dataset storing the transaction data associated with the subset of the multiple transactions;
    determining, by the server device, the accuracy of the sampled dataset by comparing the sampled dataset with the full dataset; and
    responsive to a determination that the accuracy satisfies a specified criterion, deleting the full dataset to save storage space in the data storage system.

2. The computer-implemented method of claim 1, wherein the sampled dataset consumes lesser storage space in the data storage system than the full dataset.

3. The computer-implemented method of claim 1, wherein determining the sampling rate includes determining the sampling rate based on the accuracy parameter using a statistical method.

4. The computer-implemented method of claim 1, wherein determining the accuracy includes:
    analyzing the transaction data using the full dataset to determine a first result,
    analyzing the transaction data using the sampled dataset to determine a second result, and
    comparing the first result with the second result to determine a variance between the first result and the second result.

5. The computer-implemented method of claim 4, wherein determining whether the accuracy satisfies the specified criterion includes determining that the variance is within a specified threshold.

6. The computer-implemented method of claim 4, wherein analyzing the transaction data includes:
    executing a specified query on the transaction data using the full dataset to generate the first result, and
    executing the specified query on the transaction data using the sampled dataset to generate the second result.

7. The computer-implemented method of claim 4, wherein analyzing the transaction data includes:
performing a statistical analysis on the transaction data using the full dataset to generate the first result, and
performing the statistical analysis on the transaction data using the sampled dataset to generate the second result.

8. The computer-implemented method of claim 4, wherein analyzing the transaction data includes:
forecasting the first result using the full dataset to generate, and
forecasting the second result using the sampled dataset.

9. The computer-implemented method of claim 1, wherein determining the sampling rate includes:
determining to sample a specified percentage of the multiple transactions.

10. The computer-implemented method of claim 1, wherein determining the sampling rate includes:
determining to sample transactions of a specified subset of the multiple users.

11. The computer-implemented method of claim 10, wherein the specified subset of the multiple users is selected randomly.

12. The computer-implemented method of claim 10, wherein the specified subset of the multiple users is selected based on a user-selection criterion.

13. The computer-implemented method of claim 1, wherein determining the sampling rate includes:
determining to sample transactions occurring in a specified schedule.

14. The computer-implemented method of claim 1 further comprising:
responsive to a determination that the accuracy does not satisfy the specified criterion,
adjusting the sampling rate to generate an adjusted sampling rate, and
generating an adjusted sampled dataset based on the adjusted sampling rate, wherein the accuracy of the adjusted sampled dataset is higher than that of the sampled dataset.

15. A computer-readable storage medium storing computer-readable instructions, comprising:
instructions for generating a sampled dataset, the sampled dataset storing transaction data associated with a subset of multiple transactions performed in an application by multiple users of the application;
instructions for determining an accuracy of the sampled dataset by comparing the sampled dataset with a full dataset, the full dataset representing the transaction data associated with the multiple transactions; and
instructions for deleting the full dataset from a data storage system upon a determination that the accuracy satisfies a specified criterion.

16. The computer-readable storage medium of claim 15, wherein the instructions for generating the sampled dataset include:
instructions for receiving an accuracy parameter that indicates a level of accuracy expected in a result of analysis of the transaction data,
instructions for determining a sampling rate of the multiple transactions based on the accuracy parameter, the sampling rate causing the server device to store the transaction data of the subset of the multiple transactions, and
instructions for generating the sampled dataset based on the sampling rate.

17. The computer-readable storage medium of claim 15, wherein the instructions for determining the accuracy of the sampled dataset include:
instructions for analyzing the transaction data using the full dataset to determine a first result,
instructions for analyzing the transaction data using the sampled dataset to determine a second result, and
instructions for comparing the first result with the second result to determine a variance between the first result and the second result.

18. The computer-readable storage medium of claim 17, wherein the instructions for determining whether the accuracy satisfies the specified criterion include instructions for determining that the variance is within a specified threshold.

19. A system, comprising:
a processor;
a first component configured to store a full dataset in a data storage system, the full dataset representing transaction data associated with multiple transactions performed by multiple users of an application;
a second component configured to determine a sampling rate of the multiple transactions based on an accuracy parameter, the accuracy parameter indicating a level of accuracy expected in a result of analysis of the transaction data, the sampling rate causing the server device to store the transaction data of a subset of the multiple transactions;
a third component configured to generate a sampled dataset based on the sampling rate, the sampled dataset storing the transaction data associated with the subset of the multiple transactions; and
a fourth component configured to delete the full dataset from the data storage system in an event the accuracy of the sampled dataset satisfies a specified criterion.

20. The system of claim 19 further comprising:
a fifth component that is configured to determine the accuracy by comparing a first result of analysis of the sampled dataset with a second result of analysis of the full dataset.

* * * * *